(12) United States Patent
Hente et al.

(10) Patent No.: US 7,538,306 B2
(45) Date of Patent: May 26, 2009

(54) ILLUMINATION DEVICE

(75) Inventors: Dirk Hente, Wuerselen (DE); Edward Willem Albert Young, Maastricht (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 12/090,876

(22) PCT Filed: Oct. 10, 2006

(86) PCT No.: PCT/IB2006/053716

§ 371 (c)(1),
(2), (4) Date: Apr. 21, 2008

(87) PCT Pub. No.: WO2007/046030

PCT Pub. Date: Apr. 26, 2007

(65) Prior Publication Data

US 2008/0210847 A1 Sep. 4, 2008

(30) Foreign Application Priority Data

Oct. 20, 2005 (EP) .................... 05109792

(51) Int. Cl.
*G09G 3/32* (2006.01)
*G01J 1/32* (2006.01)
(52) U.S. Cl. ......................... 250/205; 345/84
(58) Field of Classification Search ................. 250/205, 250/214 R, 216, 552; 345/76, 82, 84; 315/169.2, 315/169.3
See application file for complete search history.

(56) References Cited

U.S. PATENT DOCUMENTS

| 6,081,073 | A | 6/2000 | Salam | |
|---|---|---|---|---|
| 6,320,325 | B1 | 11/2001 | Cok et al. | |
| 7,321,348 | B2 * | 1/2008 | Cok et al. | 345/82 |
| 2002/0171611 | A1 * | 11/2002 | Cok | 345/82 |
| 2003/0122813 | A1 * | 7/2003 | Ishizuki et al. | 345/211 |
| 2003/0179163 | A1 | 9/2003 | Tsuchida | |
| 2004/0032382 | A1 | 2/2004 | Cok et al. | |
| 2004/0070558 | A1 | 4/2004 | Cok et al. | |

FOREIGN PATENT DOCUMENTS

WO   WO2004086345 A1   10/2004

\* cited by examiner

*Primary Examiner*—Kevin Pyo

(57) ABSTRACT

An illumination device comprising an organic light-emitting diode (1) (OLED) having a light output that changes with use with an illumination/active area (2,3), where light is being emitted for an illumination purpose, a reference area (4) being substantially smaller than the illumination area (2), wherein the reference area (4) is an isolated area (4) not connected to the illumination/active area (2,3), a substrate, on which the reference area (4) and the illumination/active area (2,3) are located, a driver (5) connected to the illumination/active area (2,3) and the reference area (4), with a measurement circuit (6) detecting at least one active value of the illumination/active area (2,3) and at least one reference value of the reference area (4), a control circuit (7), which compares the active and the reference value and produces a correction signal in response thereto to compensate the changes in the light output of the illumination area (2), wherein the control circuit (7) calculates the correction signal for the illumination area (2) based on the active value and the reference value.

12 Claims, 2 Drawing Sheets

ILLUMINATION DEVICE

Figure 1:
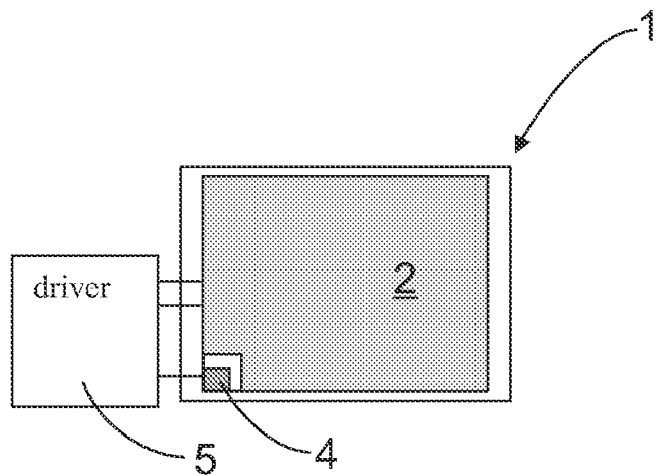

The present invention relates to an illumination device comprising an organic light-emitting diode (OLED) having a light output that changes with use.

Illumination devices with organic light-emitting diodes are of great interest as superior flat-panel systems. Theses systems utilize current passing through thin layers of organic material to generate light. The color of light emitted and the efficiency of the energy conversion from current to light are determined by the composition of the organic material. However, as the OLED is used, the organic materials in the illumination device age and become less efficient at emitting light. This reduces the lifetime of the illumination device.

US 2004/0070558 A1 describes an organic light-emitting diode (OLED) display system having addressable pixels on a substrate, the pixels having performance attributes, and a control circuit for controlling the pixels of the display device, comprising one or more OLED pixels and an OLED reference pixel located on a substrate and connected to the control circuit. The OLED reference pixel comprise the same performance attribute as the one or more OLED pixel, wherein the OLED reference pixel have voltage sensing circuit including a transistor connected to one of the terminals of the OLED reference pixel for sensing the voltage across the OLED reference pixel to produce a voltage signal representing the voltage across the OLED reference pixel. Furthermore, the organic light-emitting diode comprises a measurement circuit to produce an output signal representative of the performance attribute of the OLED reference pixel and an analyse circuit connected to the measurement circuit to receive the output signal, comparing the performance attributes with predetermined performance attributes, and producing a feedback signal in response thereto. The said control circuit is responsive to the feedback signal to compensate for changes in the output of the OLED pixels. Disadvantageously, the described OLED display system making use of reference pixels to compensate aging effects is restricted to displays. Large area OLED devices for illumination, however, are not pixelated. Thus, the proposed device and method in US 2004/0070558 cannot be applied for non-pixelated illumination areas.

U.S. Pat. No. 6,081,073 and U.S. Pat. No. 6,320,325 describes the use of sensors to measure the light output. One of the essential disadvantages is that the use of additional sensors generate more costs, moreover, the degradation issue is not solved but shifted to the sensor.

The invention has for its object to eliminate the above mentioned disadvantages. In particular, it is an object of the invention to provide an illumination device, which is simple and can be easily adjusted to produce a light, whereby the light output of the illumination device is constant over its lifetime.

This object is achieved by an illumination device as taught by claim 1 of the present invention. Accordingly, an illumination device is provided, comprising an organic light-emitting diode (OLED) having a light output that changes with use with an illumination area and/or an active area, where light is being emitted for an illumination purpose. Furthermore, the illumination device includes a reference area being substantially smaller than the illumination area and a substrate, on which the illumination area, the active area and the reference area are located. One of the important characteristics of the invention is that a driver is connected to the reference area, the illumination area and/or the active area comprising a measurement and a control circuit to drive the reference area separately to the illumination area and/or active area. The measurement circuit detects at least one active value of the illumination area and/or the active area and at least one reference value of the reference area. The function of the control circuit is to compare the active and the reference value and to produce a correction signal in response thereto to compensate the changes in the light outputs of the illumination area, whereby the control circuit calculates the correction signal for the illumination area based on the active value and the reference value. Thus, the illumination device comprises an illumination area, which emits light for illumination purpose being always in use during the "normal" illumination process. The active area is an area of the illumination device, which is a reproduction of the illumination area (same layer stack), wherein the active area is always in use during the illumination process. That means that the active area emits light during the illumination process while the illumination area is also in use. In one possible embodiment of the invention the active area is the illumination area itself. Alternatively, the active area consists of any shape substantially smaller than the illumination area. Advantageously, the active area comprises a similar shape substantially smaller than the illumination area. The reference area is an area of the illumination device, which is a reproduction of the illumination area, wherein the reference area is never in use during the illumination process. The reference area can be of any shape substantially smaller than the illumination area. Advantageously, the reference area is of similar shape substantially smaller than the illumination area. Thus, the OLED is subdivided into one or more active areas and one or more reference areas.

The OLED device of this invention is typically provided over a supporting substrate where either the cathode or anode can be in contact with the substrate. The electrode in contact with the substrate is conventionally referred to as the bottom electrode. Conventionally, the bottom electrode is the anode, but this invention is not limited to that configuration. The substrate can either be transmissive or opaque. Substrates can include, but are not limited to, glass, plastic, semiconductor materials, silicone, ceramics, circuit board materials. According to the invention the reference area is an isolated area not connected to the active area. That means that during the pure illumination process the reference area is switched-off, wherein the illumination area and/or the active area produces the light output. Only, when the control circuit is activated, the reference area is switched-on.

Preferably, the OLED is a bottom emitting device or a top emitting device, whereby the illumination device in combination with said OLED can be used in systems with controllable color. That means that the driver compares the characteristics of both areas to determine the amount of correction for the driving of the illumination area. These values are fed into the control circuitry, which adjusts the driving current to achieve constant light output. Preferably, the driver includes a fixed device characteristic for estimating the correction signal. The fixed device characteristic can comprise a mathematic function and/or a lookup table in a microcontroller based control circuit. The compensation characteristic depends on the OLED device and can be changed programmatically. The amount of compensation to achieve a constant light output over lifetime can be realized in form of a controlling algorithm of a microcontroller based circuitry. Advantageously, the reference area, which is not fed by the driving current during the normal illumination process, can be integrated with the illumination area, which is in a preferred embodiment the active area. That means that the reference area is an integral part of the active area in a sense that both areas are located on the same substrate. The advantage is that the reference area and the active area have more or less the same characteristics especially for aging aspects.

According to a preferred embodiment of the invention the reference area is a smaller reproduction of the illumination area. In order to compare the active and the reference value the control circuit has to convert the detected active value or the reference value in order to compare both values. For aging compensation the control circuit compares the behaviour of the reference area to the behaviour of the active area. According to one possible embodiment the active and the reference value are voltage values measured for constant driving current. Depending on the deviation of the measured values for the active area compared to the reference area the driving current is varied for constant light output. Alternatively, the active and the reference value can be a capacity value measured by the measurement circuit. The advantage for building up the reference area as a smaller reproduction of the illumination area is that for a given size of substrate the area which can be used for illumination purpose is maximized.

According to a preferred embodiment of the invention the illumination area is the active area of the illumination device. In another possible embodiment of the illumination device the active area is a smaller reproduction of the illumination area, whereby the active area and the reference area are similar in a mathematical sense. Said active area is connected to the illumination area. Preferably, the reference area is an isolated area being not connected to the illumination area. The advantage for building up the active area as a smaller reproduction of the illumination area is that the procedure for comparing the detected values of the active and the reference area can be simplified. In this case the geometry of the reference area is almost equal to the geometry of the illumination area, wherein the reference area is scaled smaller than the illumination area. In other words, to get a good comparability of the detected active and reference value, the dimensions of said areas are similar or equal, preferably. Surprisingly it has been found that said comparability is maximized, if reference, active and illumination area are similar in the mathematical sense, i.e. congruent to the result of a uniform scaling.

According to another preferred embodiment the reference area and/or active area are located at the border of the illumination area. Certainly, other positions of the reference area and/or the active area are possible. The size of the reference area and/or the active area is constructed in such a way that the human eye cannot detect these areas during the illumination process of the OLED and measurement cycles for aging compensation.

Furthermore it is preferred that more than one active area and/or reference area are positioned at the illumination area to increase the accuracy of the aging compensation and/or simplify the correction algorithm. Important is that in all described embodiment the driver is connected with the illumination area, the reference area and the active area separately.

The isolated reference area can be made during the manufacturing process of the OLED. Alternatively, the reference area can be separated in a postproduction process, e.g. by laser cutting or placed on a separate substrate.

The preferred invention relates to a method for controlling an aging process of an illumination device including an organic light-emitting diode (OLED) having a light output that changes with use with an illumination area and/or an active area, where light is being emitted for illumination purpose. Furthermore the illumination device comprises a reference area being substantially smaller than the illumination area, a substrate, on which the reference area and the illumination area and/or the active area are located. A driver is connected to the reference area and the illumination area and/or the active area. The inventive method comprises the steps of detecting at least one active value of the active area and at least one reference value of the reference area by a measurement circuit. After this step the active and the reference values are compared and a correction signal in response thereto to compensate the changes in the light output of the illumination area is produced by a control circuit. Said control circuit calculates the correction signal for the illumination area based on the active value and the reference value.

The described steps of the correction calculation process may be performed continuously or periodically during use, at power-up or power-down. Alternatively, the correction calculation process may be performed in response to user signal supplied to the control circuit. The correction process can be conducted hourly, e.g. for high-precision light sources. For other lighting systems, e.g. for ambient lighting systems the intervals of the correction process can be lager. In one possible embodiment of the invention the active area is the illumination area, wherein the driver converts the detected active value or the reference value in order to compare both values. The conversion is needed because of the different sizes of the active area and the reference area.

Alternatively, the active area has the same size as the reference area, whereby the active area is a non-isolated area connected with the illumination area. In this case the active area works as reference for the illumination area, wherein the conversion of the detected active value and the reference value is simplified. The measured values of the active area and the reference area can be different characteristics of both areas, for example voltage values or capacity values.

According to the invention, the driver can comprise a fixed device characteristic, which determines the correction signal. The fixed device characteristic can comprise a mathematic function and/or a lookup-table to generate the correction signal. The control circuit calculates the correction signal by a special algorithm. To further reduce the possibility of complications resulting from inaccurate active and reference value readings or inadequately compensated illumination area temperatures, changes to the correction signals applied to the input signals may be limited by the control circuit. Any change in correction can be limited in magnitude, for example to a 4% change. Correction changes can also be averaged over time. Alternatively, an actual correction can be made only after taking several readings, for example every time the OLED is powered on, a correction calculation is performed and a number of calculated correction signals are averaged to produce the actual correction signal that is applied to the OLED.

During the normal illumination process of the OLED the reference area is switched off, that means that the reference area is dark. Said reference area can be made almost invisible to the human eye by proper location in the illumination device and/or down scaling of area size of said reference area.

The illumination device as well as the method mentioned above can be used in a variety of systems amongst them systems being automotive systems, home lighting systems, backlighting systems for displays, ambient lighting systems, flashes for cameras (with adjustable color) or shop lighting systems.

The aforementioned components, as well as the claimed components and the components to be used in accordance with the invention in the described embodiments, are not subject to any special exceptions with respect to the size, shape, material selection as technical concept such that the selection criteria known in the pertinent field can be applied without limitations.

Additional details, characteristics and advantages of the object of the invention are disclosed in the subclaims and the following description of the respective Figures—which is an exemplary fashion—show several preferred embodiments of the illumination device according to the invention.

Figure 2:
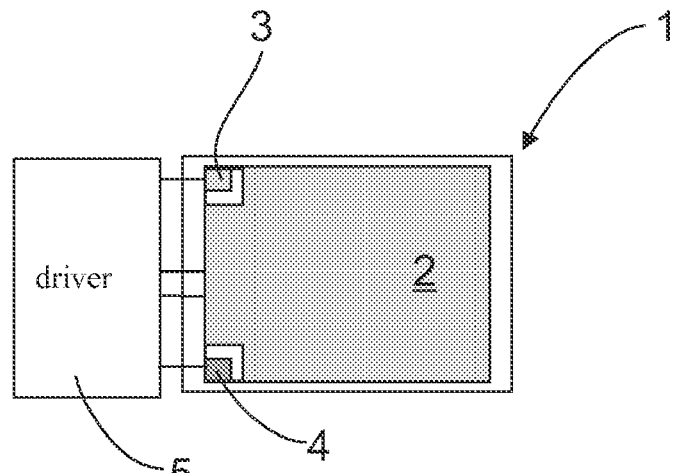
Figure 3:
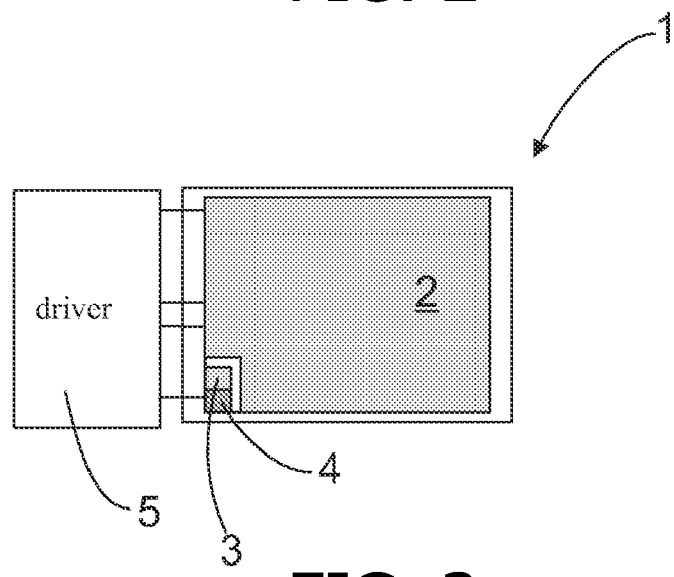
Figure 4:
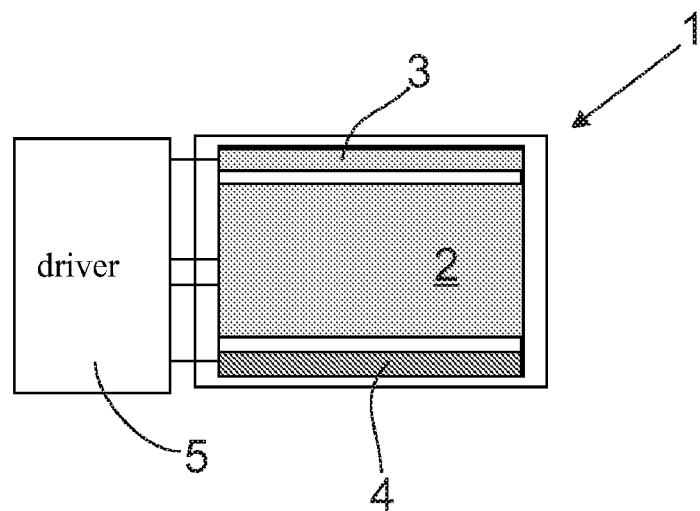
Figure 5:
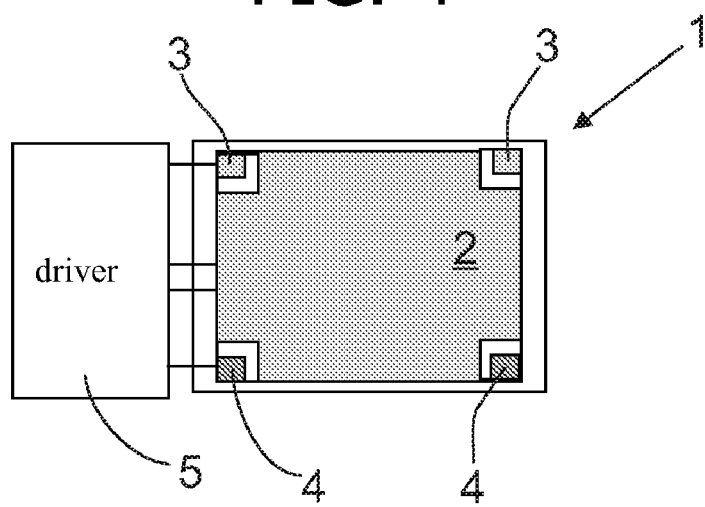
Figure 6:
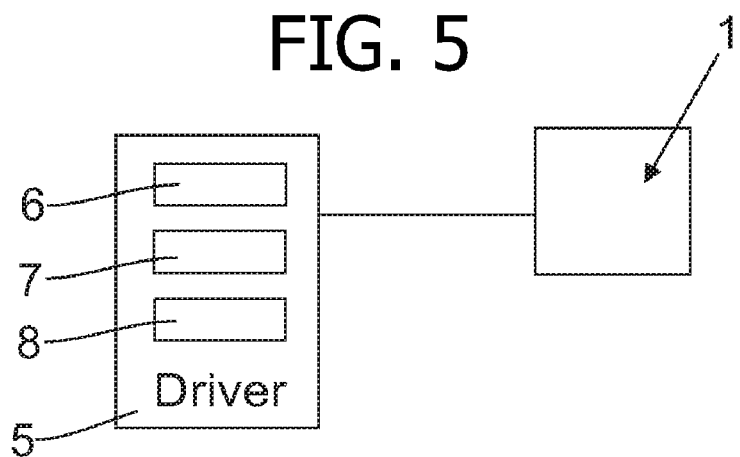

FIG. 1 shows a very schematic view of an illumination device according to a first embodiment of the present invention, FIG. 2 shows a very schematic view of an illumination device according to a second embodiment of the present invention, FIG. 3 shows a very schematic view of an illumination device according to a third embodiment of the present invention, FIG. 4 shows a very schematic view of an illumination device according to a fourth embodiment of the present invention, FIG. 5 shows a very schematic view of an illumination device according to a fifth embodiment of the present invention and FIG. 6 shows a very schematic view of an illumination device connected with a driver.

FIG. 1 shows an illumination device with an organic light-emitting diode 1 (OLED). The OLED 1 is subdivided into an illumination area 2, where light is being emitted for an illumination purpose. Furthermore, the illumination device comprises a reference area 4 being substantially smaller than the illumination area 2. The illumination area 2 and the reference area 4, which are located on a same substrate, are connected separately with a driver 5. As shown in FIG. 6, the driver 5 comprises a measurement circuit 6, a control circuit 7 and a fixed device characteristic 8.

For the correction calculation process to control the aging of the OLED said measurement circuit 6 detects an active value of the illumination area 2 and a reference value of the reference area 4. The active value of the illumination area 2 will change as a function of time due to the ageing behaviour of the illumination device 1. The control circuit 7 compares the active and the reference value and produces a correction signal in response thereto to compensate the changes in the light output in the illumination area 2. The fixed device characteristic 8 calculates the correction signal for the illumination area 2 based on the values of the illumination area (2) and the reference areas (4). Before the control circuit 7 compares both detected values a conversion process of said values is started. The amount of compensation to achieve a constant light output of the illumination device is achieved by the fixed device characteristic 8, which determines a correction signal. In a possible embodiment of the invention the fixed device characteristic 8 can comprise a mathematic function for generating the correction signal. Also the fixed device characteristic 8 can include an algorithm with lookup-table in a microcontroller based in the control circuit 7. During the normal illumination process the reference area 4 is not activated, i.e. a current does not flow through this area 4. For aging compensation the driver 5 compares the behaviour of the reference area 4 to the behaviour of the illumination area 2, e.g. by measuring the device voltage for constant driving current. Depending on the deviation of the measured values for the illumination area 2 compared to the reference area 4 the driving current is varied for constant light output. In another not shown embodiment the device characteristic 8 is integrated in the control circuit 7.

FIG. 2 shows an illumination device with almost the same characteristics described in FIG. 1. One of the essential differences is that the OLED 1 is subdivided into an illumination area 2, an active area 3 and a reference area 4. The active area 3 and the illumination area 2 are both used for illumination purpose, wherein the active area 3 works as a reference for the illumination area 2. The active area 3 is a non-isolated area connected with the illumination area 2, wherein the reference area 4 is an isolated area 4. The active value of the active area will also change as a function of time due to the ageing behaviour of the illumination device 1. During the normal operation of the OLED 1 a current does not flow to the reference area 4. The active area 3 and the reference area 4 are located at the OLED 1 separately. According to FIG. 3 it is also possible that the isolated reference area 4 and the non-isolated active area 3 are placed next to each other. Advantageously, the active area 3 and the reference area 4 have the same size. Thus, a conversion process of the detected active value and reference value is simplified.

Certainly, the geometric form of the active area 3 and the reference area 4 as well as the position can be varied, which is shown in FIG. 4 or FIG. 5. According to FIG. 4 the active area 3 is located at the top side of the illumination area 2. The reference area 4 is placed at the opposite side (bottom side) of the illumination area 2. In the shown embodiment of FIG. 4 the active area 3 and the reference area 4 have the same geometric form (narrow rectangle). In the described embodiments of FIG. 2-5 the active area 3 and the reference area 4 are a small copy (reproduction) of the illumination area 2 in order to simplify the correction calculation process. As illustrated in FIG. 5, the illumination device can comprise more than one active area 3 and more than one reference area 4. In this embodiment two active areas 3 and two reference areas 4 are used, wherein all areas 3, 4 are located at each corner of the illumination area 2.

LIST OF NUMERALS 1 light-emitting diode (OLED)
2 illumination area
3 active area
4 reference area
5 driver
6 measurement circuit
7 control circuit
8 fixed device characteristic

The invention claimed is:
1. An illumination device comprising
a) an organic light-emitting diode (1) (OLED) having a light output that changes with use with
b) an illumination area (2) and/or an active area (3), where light is being emitted for an illumination purpose,
a reference area (4) being substantially smaller than the illumination area (2), wherein the reference area (4) is an isolated area (4) not connected to the illumination area (2) and/or active area (3), a substrate, on which the reference area (4), the illumination area (2) and/or the active area (3) are located,
c) a driver (5) connected to the reference area (4), the illumination area (2) and/or the active area (3) to drive the reference area (4) separately from the illumination area (2) and/or the active area (3), with
a measurement circuit (6) detecting at least one active value of the illumination area (2) and/or the active area (3) and at least one reference value of the reference area (4),
a control circuit (7), which compares the active and the reference value and produces a correction signal in response thereto to compensate the changes in the light output of the illumination area (2), wherein the control circuit (7) calculates the correction signal for the illumination area (2) based on the active value and the reference value.

2. Illumination device as claimed in claim 1, characterized in that the active area (3) is a non-isolated area (3) connected to the illumination area (2).

3. Illumination device as claimed in claim 1, characterized in that the driver (5) is connected with the illumination area (2), the reference area (4) and the active area (3) separately.

4. Illumination device according to claim 1, characterized in that the reference area (4) and/or the active area (3) is substantially smaller than the illumination area (2).

5. Illumination device according to claim 1, characterized in that the reference area (4) and/or the active area (3) are located at the border of the illumination area (2).

6. Illumination device according to claim 1, characterized in that the driver (5) includes a fixed device characteristic (8) for estimating the correction signal.

7. A method for controlling an aging process of an illumination device including an organic light-emitting diode (1) (OLED) having a light output that changes with use with
   a) an illumination area (2) and/or an active area (3), where light is being emitted for an illumination purpose,
   a reference area (4) being substantially smaller than the illumination area (2), wherein the reference area (4) is an isolated area (4) not connected to the illumination area (2) and/or active area (3),
   a substrate, on which the reference area (4), the illumination area (2) and/or the active area (3) are located,
   b) a driver (5) connected to the reference area (4), the illumination area (2) and/or the active area (3) to drive the reference area (4) separately from the illumination area (2) and/or the active area (3), comprising the steps of:
   detecting at least one active value of the illumination area (2) and/or the active area (3) and at least one reference value of the reference area (4) by a measurement circuit (6),
   comparing the active and the reference value and producing a correction signal in response thereto to compensate the changes in the light output of the illumination area (2) by a control circuit (7), which
   calculates the correction signal for the illumination area (2) based on the active value and the reference value.

8. The method as claimed in claim 7, characterized in that a fixed device characteristic (8) determines the correction signal.

9. The method as claimed in claim 8, characterized in that the fixed device characteristic (8) comprises a mathematic function and/or a lookup table to generate the correction signal.

10. The method for controlling an aging process of an illumination device including an organic light-emitting diode (1) (OLED) having a light output that changes with use with
    a) an illumination area (2) and/or an active area (3), where light is being emitted for an illumination purpose,
    a reference area (4) being substantially smaller than the illumination area (2), wherein the reference area (4) is an isolated area (4) not connected to the illumination area (2) and/or active area (3), a substrate, on which the reference area (4), the illumination area (2) and/or the active area (3) are located,
    b) a driver (5) connected to the reference area (4), the illumination area (2) and/or the active area (3) to drive the reference area (4) separately from the illumination area (2) and/or the active area (3), comprising the steps of:
    detecting at least one active value of the illumination area (2) and/or the active area (3) and at least one reference value of the reference area (4) by a measurement circuit (6),
    comparing the active and the reference value and producing a correction signal in response thereto to compensate the changes in the output of the area (2) by a control circuit (7), which
    calculates the correction signal for the illumination area (2) based on the active value and the reference value, characterized in that the steps of claim 8 are conducted periodically, wherein for normal illumination of the illumination device (1) the reference area (4) is switched off.

11. The method according to claim 7, characterized in that the active and the reference value are current values and/or voltage values and/or capacity values.

12. The method according to claim 7 with an illumination device according comprising
    a) an organic light-emitting diode (1) (OLED) having a light output that changes with use with
    b) an illumination area (2) and/or an active area (3), where light is being emitted for an illumination purpose,
    a reference area (4) being substantially smaller than the illumination area (2), wherein the reference area (4) is an isolated area (4) not connected to the illumination area (2) arid/or active area (3), a substrate, on which the reference area (4), the illumination area (2) and/or the active area (3) are located,
    c) a driver (5) connected to the reference area (4), the illumination area (2) and/or the active area (3) to drive the reference area (4) separately from the illumination area (2) and/or the active area (3), with
    a measurement circuit (6) detecting at least one active value of the illumination area (2) and/or the active area (3) and at least one reference value of the reference area (4),
    a control circuit (7), which compares the active and the reference value and produces a correction signal in response thereto to compensate the changes in the light output of the illumination area (2), wherein
    the control circuit (7) calculates the correction signal for the illumination area (2) based on the active value and the reference value.

* * * * *